US006401552B1

(12) United States Patent
Elkins

(10) Patent No.: US 6,401,552 B1
(45) Date of Patent: Jun. 11, 2002

(54) CENTRIFUGE TUBE AND METHOD FOR COLLECTING AND DISPENSING MIXED CONCENTRATED FLUID SAMPLES

(76) Inventor: Carlos D. Elkins, 1414 S. Fairplain Ave., Whittier, CA (US) 90601

( * ) Notice: Subject to any disclaimer, the term of this patent is extended or adjusted under 35 U.S.C. 154(b) by 0 days.

(21) Appl. No.: 09/551,221

(22) Filed: Apr. 17, 2000

(51) Int. Cl.[7] .......... G01N 1/00

(52) U.S. Cl. .......... 73/863; 422/100; 422/101; 422/102; 422/104

(58) Field of Search .......... 436/46, 500; 422/100, 422/101, 102, 104, 71; 494/10, 16, 17; 435/102; 210/198.2, 359, 321.84, 650, 232; 73/863

(56) References Cited

U.S. PATENT DOCUMENTS 3,380,888 A * 4/1968 Numerof et al. .......... 436/500
3,918,909 A * 11/1975 Arlman .......... 422/71
4,244,694 A * 1/1981 Farina et al. .......... 436/500
4,683,058 A * 7/1987 Lyman et al. .......... 210/359
5,647,990 A * 7/1997 Vassarotti .......... 210/650
5,693,223 A * 12/1997 Yamada et al. .......... 210/198.2
5,840,502 A * 11/1998 Van Vlasselaer .......... 435/7.21
5,855,852 A * 1/1999 Bienhaus et al. .......... 422/102
5,859,374 A * 1/1999 Mink et al. .......... 73/863
5,879,635 A * 3/1999 Nason .......... 422/102
5,910,246 A * 6/1999 Walter et al. .......... 210/232
6,156,199 A * 12/2000 Zuk, Jr. .......... 210/321.84
6,221,655 B1 * 4/2001 Fung et al. .......... 435/288.1

* cited by examiner

*Primary Examiner*—Jill Warden
*Assistant Examiner*—Brian Sines
(74) *Attorney, Agent, or Firm*—Edgar W. Averill, Jr.

(57) ABSTRACT

A centrifuge tube for collecting and dispensing a mixed concentrated fluid sample. The centrifuge tube has an elongated tube body with an open top end and a bottom end preferably having a dispensing spout. A divider insert is positioned inside the inner volume of the tube body to divide the inner volume into upper and lower chambers. The divider insert has a funnel shape with an inverted conical section and a funnel spout having a spout tip. The spout tip extends into the lower chamber while remaining above the bottom end. Upon filling the upper chamber with a fluid and subjecting it to centrifugal forces inside a centrifuge, a concentrated fluid sample is collected in the lower chamber with an air pocket captured between the spout tip and the divider insert. The concentrated fluid sample may then be agitated to mix the sedimented solids with the liquid of the concentrated fluid sample, and the now mixed concentrated fluid sample subsequently dispensed through the dispensing spout.

12 Claims, 2 Drawing Sheets

CENTRIFUGE TUBE AND METHOD FOR COLLECTING AND DISPENSING MIXED CONCENTRATED FLUID SAMPLES

BACKGROUND OF THE INVENTION

The field of the invention pertains to centrifuge devices and methods. The invention relates more particularly to a centrifuge tube which utilizes a funnel-shaped divider insert for collecting and dispensing mixed, concentrated fluid samples, and a method for collecting and dispensing the same.

Medical and other laboratories routinely process and handle various sample test fluids, e.g. urine from a human subject, for microscopic observation and analysis. In many of these procedures, such as urinalysis, the sample test fluid is generally much too diluted to quantitatively or qualitatively observe and analyze the solid particles, bacteria, and other constituents, e.g. blood cells, present in the fluid. Therefore, these particulates and fluid constituents must be accumulated to increase the particulate concentration of the test fluid. This is typically accomplished by subjecting the fluid samples to centrifugal forces in a centrifuge. Centrifugation produces a highly concentrated fluid sample which can facilitate identification of certain particulates and constituents present in the fluid, and which ultimately facilitates analysis of the fluid under a microscope.

In a typical urinalysis procedure, for example, a urine sample is taken from a test subject and placed in a test tube which is then spun in a centrifuge, thereby forcing denser particulate material to the bottom of the tube. Subsequently, most of the supernatant liquid produced is decanted off the top. In one common sample preparation method a pipette having a bulbous portion is then placed into the centrifuge tube and squeezed to agitate, disperse and sample the sedimented particulates and some of the liquid at the bottom of the tube. The concentrated sample is then transferred to a microscope slide for observation and analysis.

In an effort to improve this and other fluid concentrating procedures, various types of devices and methods have been developed whereby the particles and solids in a fluid sample may be collected and concentrated in a relatively small volume of liquid. For example, in U.S. Pat. No. 3,914,985 a centrifuge tube is shown having a closed outer tube and a removable inner tube placed inside the closed outer tube. A capillary tube is held by the removable inner tube. And particulate material is collected in the capillary passage, which is then separated and re-centrifuged at a higher speed to compact the particles within the capillary passage. The centrifuge tube disclosed in the '985 patent, however, is not designed or intended to remove the compacted particles for observation and study under a microscope. Rather, upon centrifugation, the columns of compacted particles are visually measured by a ruler or other measuring means to obtain a determination of the packed cell volume of the particulates, e.g. red cells.

In U.S. Pat. No. 4,981,654 a unitary centrifuge tube and dispensing receptacle is shown for facilitated dispensing of the collected sediment. After centrifuging the tube, the dispensing receptacle, i.e. the lower part, may be removed by twisting it at a short narrow tube portion which connects the dispensing receptacle to the main tube. Additionally, in U.S. Pat. No. 5,647,990, a two-part centrifuge tube is shown wherein the device has a filter and concentrating pocket in the inner reservoir, and an outer tube for filtrate collection.

Perhaps the greatest problem with the '654 and '990 patents, however, is that they do not sufficiently address the problem of adequately mixing the post-centrifuge, sedimented particulates with the liquid portion of the concentrated fluid sample collected. At high centrifuge speeds, sedimented particulates and other solid and semi-solid constituents in the fluid tend to bind and stick along the bottom of the collection reservoir, e.g. the dispensing receptacle of the '654 patent, which must be loosened and mixed prior to dispensation. This can be an arduous and difficult task, especially when air or other gaseous elements are not present to facilitate turbulent mixing. The advantage of producing an air pocket is that it provides a countervailing medium having a lesser density which enables intra-volume turbulent agitation and mixing of the post-centrifuge, concentrated fluid sample. Mixing of the centrifuged and collected fluid concentrate is an essential step in such concentration procedures because inadvertent retrieval and study of only the supernatant liquid portion of the centrifuged and concentrated, but unmixed, fluid sample would yield greatly inaccurate and misleading results.

BRIEF SUMMARY OF THE INVENTION

It is therefore an object of the present invention to provide a simple and efficient device and method for collecting and dispensing mixed concentrated fluid samples.

It is a further object of the present invention to provide a centrifuge tube having means for producing an air pocket for use in mixing the concentrated fluid sample collected subsequent to undergoing a centrifuge process.

It is a still further object of the present invention to provide a cost-effective centrifuge tube having a minimal number of components and capable of being mass-produced by conventional manufacturing methods.

It is a still further object of the present invention to provide a method for collecting and dispensing a mixed concentrated fluid sample utilizing the aforementioned centrifuge tube.

The present invention is for a centrifuge tube for collecting and dispensing a concentrated fluid sample. The centrifuge tube comprises an elongated tube body surrounding a tube volume and has an open top end and a bottom end having a discharge opening. Preferably the discharge opening is located at a tip of a discharge spout extending from the bottom end of the elongated tube body. The centrifuge tube also comprises discharge-opening occluding means, which is adapted to be disengaged from a discharge-opening closed position to a discharge-opening open position. Preferably, the centrifuge tube also comprises a top occluding means which is preferably a tube cap hinged to the open top end, and which is movable between a top open position and a top closed position occluding the open top end. And finally, the centrifuge tube has means for dividing the tube volume into an upper chamber which is adjacent the open top end, and a lower chamber which is adjacent the bottom end. The means for dividing is preferably a divider insert and has a passageway which communicates between the upper and lower chambers. The passageway has a lower terminus positioned in the lower chamber above the bottom end of the elongated tube body.

Additionally, the present invention is for a method for collecting and dispensing concentrated fluid samples which utilizes the centrifuge tube described above. The method comprises the steps of (1) providing the centrifuge tube as described above, (2) in the closed positions of the discharge opening and the open top end, filling the upper chamber with a fluid through the open top end, (3) occluding the open top end with the top occluding means, (4) subjecting the centrifuge tube to centrifugal forces in a centrifuge, such that a concentrated fluid sample is collected in the lower chamber and an air pocket is captured between the lower terminus of the passageway and the means for dividing the tube volume, (5) agitating the lower chamber to mix any centrifuged material into any liquid in the lower chamber, thereby forming a mixed concentrated fluid sample, (6) removing the discharge-opening occluding means from the discharge opening to the discharge-opening open position, and (7) dispensing the mixed concentrated fluid sample through the discharge opening.

DETAILED DESCRIPTION OF THE PREFERRED EMBODIMENTS

Figure 4:
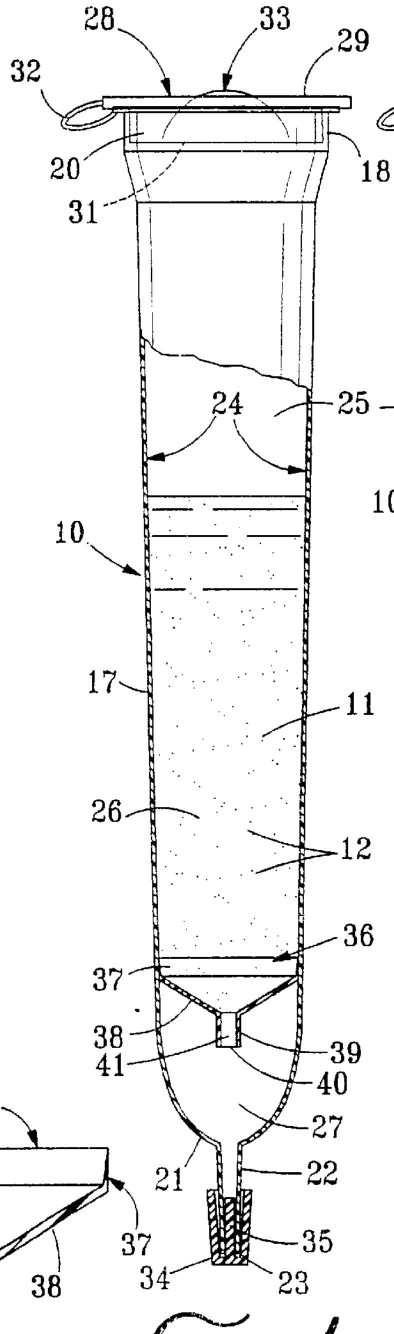
FIG. 4 is a partly cross-sectional, elevated side view of the centrifuge tube filled with a fluid sample and prior to subjecting it to a centrifuge.
Figure 5:
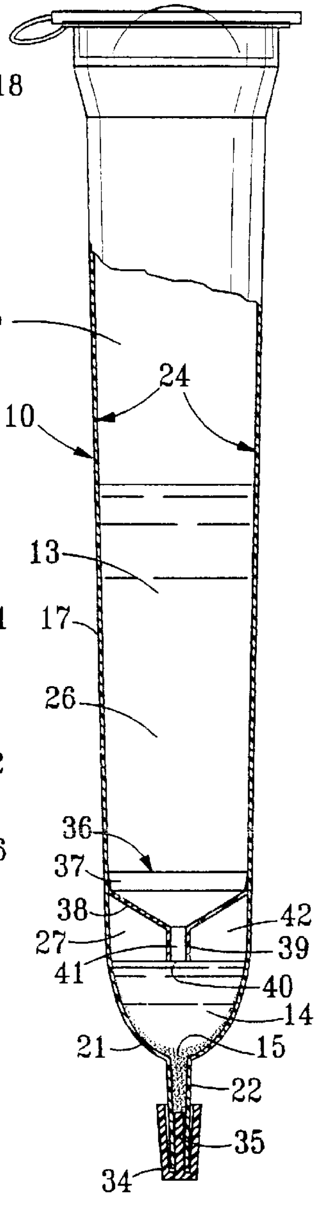
FIG. 5 is a partly cross-sectional, elevated side view of the centrifuge tube following FIG. 4, subsequent to subjecting it to a centrifuge and prior to agitation of the lower chamber.
Figure 9:
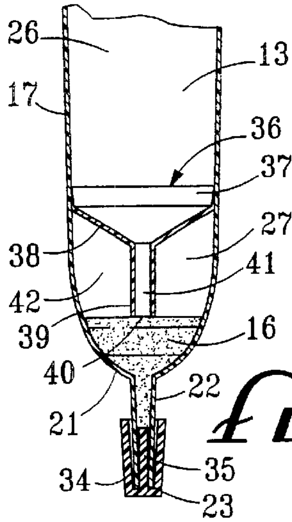
FIG. 9 is a cross-sectional, elevated side view of the lower half of the centrifuge tube having a second preferred embodiment of the divider insert having a relatively longer funnel spout, and illustrating the effect of the longer funnel spout on the collected fluid level.
Figure 6:
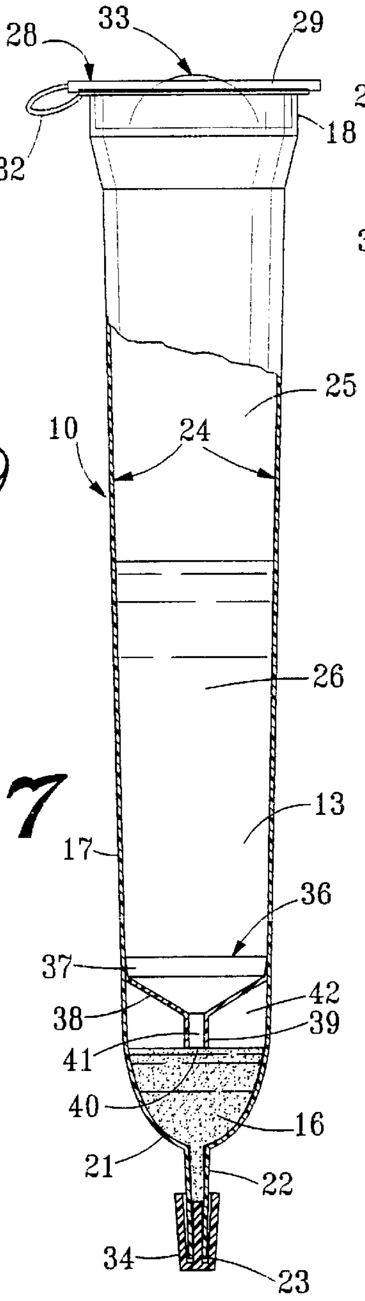
FIG. 6 is a partly cross-sectional, elevated side view of the centrifuge tube following FIG. 5, subsequent to agitation of the lower chamber.

Referring now to the drawings, FIGS. 1–9 show the centrifuge tube, generally indicated at reference character 10, and its component parts, for collecting and dispensing mixed concentrated fluid samples (16 in FIGS. 6 and 9). While the centrifuge tube 10 is typically used in urinalysis procedures for concentrating urine test samples, it is notable that other fluids may also be used, such as blood, and other fluids having solid particles contained in the liquid medium. Generally, as can be best seen in FIGS. 1, 4–8, the centrifuge tube 10 has an elongated tube body 17 which surrounds a tube volume 25. The elongated tube body 17 has an inner surface 24, an open top end 18, and a bottom end 21 with a discharge opening 23. As shown in the figures, the elongated tube body 17 preferably has a slight taper as it progresses from the open top end 18 to the bottom end 21. The taper functions to facilitate seating and positioning of the centrifuge tube 10 on a tube holder of a centrifuge (not shown). Moreover, and more importantly, the taper also functions to fixedly lodge a divider insert 36 within the tube volume 25, as will be discussed in detail below.

As shown in the figures, the bottom end 21 preferably has a discharge spout 22 which is substantially narrower than the elongated tube body 17, and which extends below the bottom end 21 of the elongated tube body 17 in a tapered fashion. The discharge spout 22 includes the discharge opening 23 at a tip thereof, which is preferably the narrowest part of the discharge spout 22, for dropping small, controlled amounts of fluid. It is notable, however, that the discharge opening 23 may alternatively be located on the bottom end 21 itself without the need for a discharge spout 22. Nevertheless, the advantage of the discharge spout 22 is to facilitate dispensation by accurately guiding the discharge opening 23. to the desired discharge locations.

Figure 1:
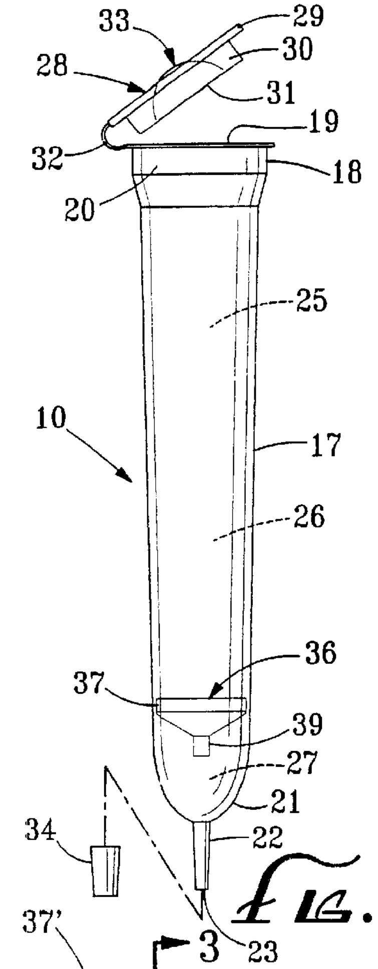
FIG. 1 is an elevated side view of the centrifuge tube with the tube cap in an open position and the spout cap removed.
Figure 7:
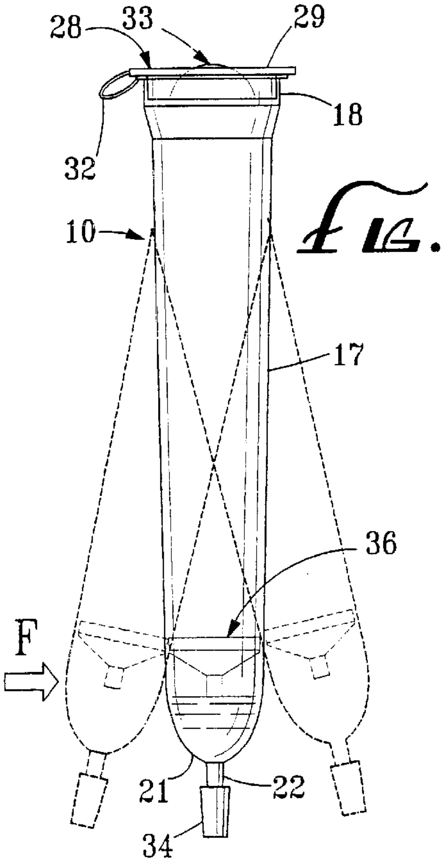
FIG. 7 is a dynamic side view of the centrifuge tube being agitated to mix the concentrated fluid sample collected in the lower chamber.
Figure 8:
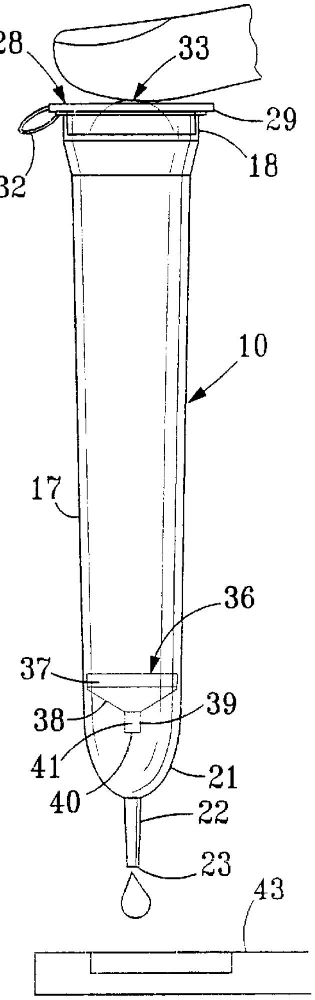
FIG. 8 is an operational side view of the centrifuge tube as a drop of the mixed, concentrated fluid sample is applied onto a slide.

Furthermore, the discharge opening 23 is occluded by discharge-opening occluding means 34 which is adapted to be disengaged from a discharge-opening closed position (see FIGS. 4, 5, 7, and 9) to a discharge-opening open position (FIGS. 1, 6, and 8). As shown in the figures, the discharge-opening occluding means 34 is preferably a spout cap 34 having a generally conical shape, and having a stopper portion 35 centrally extending upwards from the nose end of the spout cap 34. The stopper portion 35 is removably insertable into the discharge opening 23 to occlude it thereby. While the stopper portion 35 is shown in the figures to extend more or less halfway up the discharge spout 22, it is understood that the stopper portion 35 may additionally extend up to or beyond the bottom end 21 of the elongated tube body 17. The advantage of an elongated stopper portion 35 would be to prevent sedimentation inside the discharge spout 22. The discharge-opening occluding means 34 is not limited only to a spout cap, however. Various other devices and methods of occluding the discharge opening 23 may be employed, such as a clamp, a valve, an initially closed spout tip which may be cut or otherwise severed to expose the discharge opening 23, etc. (not shown). In any case, the discharge-opening occluding means 34, i.e. the spout cap 34, is adapted to remain detachably secured over the discharge opening 23 and thereby keep the discharge opening 23 occluded in the discharge-opening closed position while the centrifuge tube 10 is being agitated/shaken prior to dispensing (see below). Furthermore, the discharge-opening occluding means 34 may be disengaged, either temporarily or permanently, from the discharge-opening closed position to the discharge-opening open position, to enable dispensation of the fluid contents. Temporary disengagement allows the discharge-opening occluding means 34 to be recapped over the discharge opening 34, such as in the case of a threaded or snap-lock cap, whereby fluid contained in the centrifuge tube 10 may be stored for subsequent use. In contrast, permanent disengagement, such as by severing an integrally formed occluding piece, is typically used for single-use, disposable applications.

As can be best seen in FIG. 1, the open top end 18 of the elongated tube body 17 has a top rim 19 which preferably has a circular configuration correlating to a cross-section of the elongated tube body 17. Test fluid, such as a urine sample from a human patient, may be entered into the elongated tube body 17 through the open top end 18, such as by pouring, injecting, pipetting, etc. The open top end 18 preferably has top occluding means 28 which is adapted to move between a top-open position (FIG. 1) and a top-closed position (FIGS. 4–8). As can be seen in the figures, the top occluding means 28 is preferably a tube cap 18 having a cylindrical cap sidewall 30 with a transverse lower deck 31 at the bottom end, and a flange 29 at the top end. The flange 29 extends transversely beyond the cylindrical cap sidewall 30 such that it may contact or at least confront the top rim 19 of the open top end 18 when detachably mounted on the open top end 18 in the top-closed position. The flange 29 functions to provide a surface upon which manual pressure may be applied, for opening and closing the tube cap 28.

When in the top-closed position, the cap sidewall 30 of the tube cap 18 is snugly seated in a cap seating portion 20 of the open top end 18 whereby the open top end 18 is effectively occluded. Preferably the tube cap 28 snaps into the cap seating portion 20 to detachably secure the tube cap 28 to the open top end 18. Additionally, the tube cap 18 is preferably connected to the open top end 18 by means of a cap hinge 32. The cap hinge 32 preferably has a flexible, resiliently biasing quality which enables the tube cap 28 to move between the top-closed position and the top-open position. In the top-open position, the cap hinge 32 functions to keep the tube cap 28 conveniently near the open top end 18, yet sufficiently away from the open top end 18 to enable filling of the open top end 18 with fluid. It is notable that while the use of the tube cap 28 or other plug-type stopper is preferred, the open top end 18 may alternatively be occluded by a clamp, valve, or other occluding device or method. Moreover, the open top end 18 may even be temporarily occluded without the use of a distinct top occluding component, as in the case of occluding the open top end 18 with the thumb of the handling individual.

In a preferred embodiment, the tube cap 28 has means for controllably exerting pressure inside the tube volume 25 which functions to discharge fluid contained in the tube volume 25 through the discharge opening 23 in controlled amounts. The means for controllably exerting pressure inside the tube volume 25 is preferably a resiliently biasing surface 33 of the tube cap 28 which may be depressed to controllably exert a relatively small pressure inside the tube volume 25. As can be best seen in FIGS. 1 and 4–8, the resiliently biasing surface 33 preferably has a convex dome shape rising from the transverse lower deck 31 of the tube cap 28, which provides a more controlled and consistent displacement volume for discharging a small fluid drop (see FIG. 8). It is notable, however, that other methods of controllably exerting a pressure inside the tube volume 25 may be utilized other than the resiliently biasing surface 33 shown in the figures. For example, for a sufficiently resiliently biasing elongated tube body 17, pressure may be manually exerted by transversely squeezing the walls of the elongated tube body 17.

Figure 2:
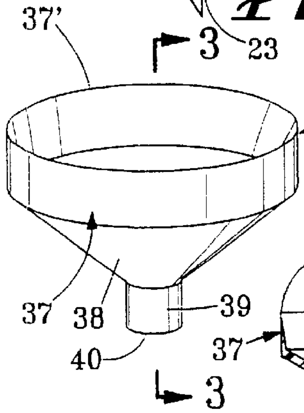
FIG. 2 is a perspective view of the divider insert.
Figure 3:
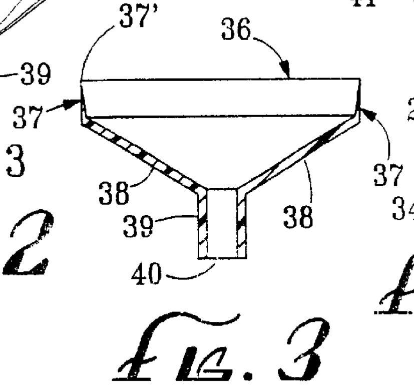
FIG. 3 is a cross-sectional view of the divider insert taken along the line 3—3 in FIG. 2.

And finally, as can be seen in the figures, particularly FIGS. 2 and 3, the centrifuge tube 10 has means for dividing the tube volume 25 into an upper chamber 26 and a lower chamber 27, which is preferably a divider insert 36. The upper chamber 26 functions to initially receive a test fluid therein, and the lower chamber 27 is for collecting a concentration of the test fluid, including fluid particulates, upon subjecting the centrifuge tube to centrifugal forces (see below). While the means for dividing the tube volume 25 is preferably the divider insert 36, which is an independent component of the centrifuge tube 10 not integrally connected to the elongated tube body 18, the means for dividing the tube volume 25 may alternatively be a fixed divider wall (not shown) integrally formed at a pre-determined position of the elongated tube body 17. In any case, the means for dividing the tube volume 25, i.e. the divider insert 36, has a passageway 41 communicating between the upper chamber 26 and the lower chamber 27 of the tube volume 25. Additionally, the means for dividing the tube volume 25 has a lower terminus 40 which is positioned in the lower chamber 27 above the bottom end 21 of the elongated tube body 17. The lower terminus 40 functions to control the concentrated fluid level in the lower chamber 27, as will be discussed in detail below.

As shown in the figures, the divider insert 36 preferably has a funnel-shaped configuration with a contact portion 37, an inverted conical portion 38 extending below the contact portion 37, and a funnel spout 39 extending below the inverted conical portion 38 to an exit opening at its tip. The passageway 41 communicating between the upper and lower chambers 26, 27 is preferably defined by the funnel spout 39, with the lower terminus 40 located at the tip of the funnel spout 39. As can be best seen in FIGS. 2 and 3, the contact portion 37 conforms to and contacts the inner surface 24 of the elongated tube body 17. Moreover, due to the preferably tapered form of the elongated tube body 17 as it extends to the bottom end 21, the contact portion 37 is lodged snugly in the tube volume 25, especially after centrifugation. It is notable that the contact surface 37 preferably does not have a ledge surface at its contact rim 37'. Rather, the contact portion 37 is preferably flush with the inner surface 24 of the elongated tube body 17 at its contact rim 37'. The absence of a ledge or other surface prevents particulates from sedimenting thereon, and instead descending down through the funnel spout 39 and into the lower chamber 27. Although not shown in the figures, it is also notable that the contact surface 37 of the divider insert 36 may also incorporate means by which it matingly snap-locks with the inner surface 24 of the elongated tube body 17 at a pre-determined position thereon near the bottom end 21. For example, one of the surfaces, i.e. the outer surface of the contact portion 37 or the inner surface 24 of the elongated tube body 17, may have an annular recess, with the other surface having an annular flange which mates with the annular recess.

As can also be best seen in FIGS. 2 and 3, the inverted conical portion 38 of the funnel configuration of the divider insert 36 has a center-converging slope which directs the test fluid into the funnel spout 39 when subjected to a centrifuge. It is notable that the length of the funnel spout 39, and consequently the length of the passageway 41 as well, can be relatively short (FIGS. 1–8), or relatively long (FIG. 9). In comparing the two lengths particularly shown in FIGS. 6 and 9, the length of the shorter passageway 41 (and funnel spout 39) in FIG. 6, in combination with the inverted conical portion 38, results in a higher position of the lower terminus 40. Inversely, the length of the longer passageway 41 (and funnel spout 39) in FIG. 9, again in combination with the inverted conical portion 38, results in a lower position of the lower terminus 40. As can be seen in both FIGS. 6 and 9, the vertical position of the lower terminus 40 will determine the fluid level in the lower chamber 27, with the rest of the lower chamber 27 comprising an air pocket 42 which facilitates mixing of the concentrated fluid (see below).

The function and purpose of the air pocket 42 produced in the lower chamber 27, as well as the component features of the centrifuge tube 10 in general, can be best understood and appreciated by considering a preferred method for utilizing the centrifuge tube 10 discussed above, i.e. a method for collecting and dispensing concentrated fluid samples. In the preferred application of the centrifuge tube 10, a test fluid, such as a yet uncentrifuged urine sample 11 (FIG. 4), is first poured or otherwise entered into the upper chamber 26 of the elongated tube body 17 while in the top-open and discharge-opening closed positions. If a top occluding means, e.g. the tube cap 28, is provided, it is then moved to the top-closed position to occlude the open top end 18. As can be seen in FIG. 4, particles 12 are found dispersed throughout the entire uncentrifuged urine sample 11 in a diluted manner. Furthermore, as shown in FIG. 4, the fluid sample 11 will tend to remain in the upper chamber 26 prior to centrifugation due to capillary action produced by the preferably relatively narrow diameter of the passageway 41. However, this will depend on the diameter of the funnel spout 39 and passageway 41, which may allow a modicum of seepage for larger diameters.

The centrifuge tube 10 containing the urine sample 11 is then placed in a centrifuge (not shown), and subsequently subjected to centrifugal forces produced thereby. As shown in FIG. 5 illustrating the centrifuge tube 10 subsequent to centrifugation, a limited amount of concentrated urine flows into the lower chamber 27 by displacing an equivalent volume of air from the lower chamber 27 of FIG. 4, and the particles 12 in FIG. 4 accumulates as sedimented particles 15 along the bottom end 21 of the elongated tube body 17 and the discharge spout 22. Consequently, the liquid portion 14 of the concentrated urine collected in the lower chamber 27, as well as the urine sample 13 remaining in the upper chamber 26, is relatively free and clear of particulates. Furthermore, the amount of air displaced by centrifugation from the lower chamber 27 is indicated by the fluid level in the lower chamber 27, which is shown reaching the tip of the funnel spout 39, i.e. the lower terminus 40 of the passageway 41. While centrifugation compels fluid flow into the lower chamber 27, the fluid level in the lower chamber 27 will not rise above the lower terminus 40, at which level fluid equilibrium between the upper and lower chambers 26, 27 is reached. Thus the air pocket 42 is produced in the lower chamber 27 above the lower terminus 40 and the fluid level. Moreover, the fluid level of the concentrated urine will determine the percent concentration of particulates contained therein. In particular, the percent concentration of particulates in the concentrated fluid collected in the lower chamber 27 will be inversely proportional to the fluid level in the lower chamber 27, i.e. the lower the fluid level, the higher the particulate concentration of the collected fluid. This inverse relationship is due to the fact that while the same amount of particulates is being sedimented in the lower chamber 27, a variable amount of liquid will flow into the lower chamber depending on the vertical location of the lower terminus 40. Thus the percent concentration of particulates in the first preferred embodiment of the centrifuge tube with the relatively short passageway 41 shown in FIGS. 1–8 will be less than that of the second preferred embodiment with the relatively longer passageway 41 and funnel spout 39 shown in FIG. 9.

Next, as can be seen in FIG. 7, the centrifuge tube 10 is preferably agitated or shaken at the bottom end 21 with a suitable force F, either manually or by other mechanical means, to loosen and mix together the sedimented particles 15 with the collected liquid portion 14 (FIG. 5). Typically, the force F is adequately provided by simply flicking or otherwise tapping the bottom end 21 with one's fingers. During the mixing step, as in the previous centrifugation step, the discharge-opening occluding means, i.e. the spout cap 34, prevents any test fluid from escaping through the discharge opening 23. Furthermore, presence of the tube cap 28 enables the vertical orientation of the centrifuge tube 10 to be inverted, whereby the air pocket 42 may rise adjacent the sedimented solids 15 (FIG.5), for direct turbulent agitation and facilitated mixing. The mixing step shown in FIG. 7 produces a mixed concentrated fluid sample 16, shown in FIG. 6, with the sedimented particles 15 now dispersed throughout the fluid. Once suitably mixed, the spout cap 34 may be removed, and the mixed concentrated fluid sample 16 dispensed through the discharge opening 23. As shown in FIG. 8, a drop 16' of the mixed and concentrated fluid sample is preferably dispensed by depressing the dome shaped resiliently biasing surface 33 of the tube cap 28 using one's thumb. In this manner, the drop 16' is discharged onto a slide 43 for viewing and analysis under a microscope.

The centrifuge tube 10 is preferably made of a suitably rigid, inert, lightweight and easily manufacturable material such as polypropylene, or other suitable plastic material. Such plastic compositions are typically economically mass-producible by conventional manufacturing methods known in the relevant art. It is notable, however, that while suitably rigid, different portions of the centrifuge tube 10 will have varying wall thicknesses to enable greater rigidity or greater flexibility, depending on its particular purpose. Therefore, and in particular, the resiliently biasing surface 33 of the tube cap 28 will have a relatively thin-walled structured to produce its resiliently biasing properties.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A centrifuge tube for collecting and dispensing a concentrated fluid sample, said centrifuge tube comprising:
   - an elongated tube body surrounding a tube volume, said elongated tube body having an open top end and a bottom end having a discharge opening;
   - discharge-opening occluding means adapted to be disengaged from a discharge-opening closing position to a discharge-opening open position; and
   - means for dividing said tube volume into an upper chamber adjacent said open top end, and a lower chamber adjacent said bottom end, said means for dividing having a funnel-shaped configuration with an inverted conical portion having an upper end sealingly positioned in said elongated tube body and said inverted conical portion having a lower conical surface having a passageway at a converging point thereof, said passageway communicating between said upper and lower chambers, said passageway having a lower terminus positioned in said lower chamber of said bottom end of said elongated tube body, thereby forming a volume between said lower conical surface and a horizontal plane intersecting said lower terminus.

2. The centrifuge tube as in claim 1,
   wherein said means for dividing is a divider insert positioned within said tube volume, said divider insert having a contact surface adapted to snugly contact an inner surface of said elongated tube body and said lower terminus of said passageway located below said contact surface and above said bottom end.

3. The centrifuge tube as in claim 2,
   wherein said elongated tube body is convergingly tapered toward said bottom end, whereby said divider insert is lodged in said elongated tube body near said bottom end.

4. The centrifuge tube as in claim 1,
   wherein said bottom end of said elongated tube body has a discharge spout comprising said discharge opening at a tip thereof and said discharge-opening occluding means is a spout cap adapted to detachably mount on said discharge spout when in the discharge-opening closed position.

5. The centrifuge tube as in claim 1,
   further comprising a top occluding means adapted to move between a top-open position and a top-closed position occluding said open top end.

6. The centrifuge tube as in claim 5,
   wherein said top occluding means is a tube cap adapted to detachably mount on said open top end when in the top-closed position.

7. The centrifuge tube as in claim 6, wherein said tube cap has means for controllably exerting pressure inside said tube volume whereby a fluid sample may be dispensed from said discharge opening.

8. The centrifuge tube as in claim 7, wherein said means for controllably exerting pressure is a resiliently biasing surface formed in said tube cap.

9. The centrifuge tube as in claim 8, wherein said resiliently biasing surface has a convex shape.

10. A method for collecting and dispensing concentrated fluid samples, said method comprising the steps of:

providing a centrifuge tube comprising, an elongated tube body surrounding a tube volume, said elongated tube body having an open top end and a bottom end having a discharge spout with a discharge opening, discharge-opening occluding means adapted to be disengaged from a discharge-opening closed position to a discharge-opening open position, top occluding means adapted to move between a top-open position and a top-closed position occluding said open top end, and means for dividing said tube volume into an upper chamber adjacent said open top end and a lower chamber adjacent said bottom end, said means for dividing having a contact surface for snugly contacting an inner surface of said elongated tube body, and a passageway communicating between said upper and lower chambers, said passageway having a lower terminus positioned in said lower chamber below said contact surface and above said bottom end of said elongated tube body;

in the discharge-opening closed position of said discharge opening and the top-open position of said open top end, filling said upper chamber with a fluid through said open top end;

occluding said open top end with said top occluding means;

subjecting said centrifuge tube to centrifugal forces in a centrifuge, whereby a concentrated fluid sample is collected in said lower chamber and an air pocket is captured between said lower terminus of said passageway and said means for dividing said tube volume;

agitating said lower chamber to mix any centrifuged material into any liquid in said lower chamber thereby forming a mixed concentrated fluid sample;

removing said discharge-opening occluding means from said discharge opening to the discharge-opening open position; and dispensing said mixed concentrated fluid sample through said discharge opening.

11. The method as in claim 10, wherein said top occluding means has means for controllably exerting pressure inside said tube volume;

wherein said step of dispensing said mixed concentrated fluid sample through said discharge opening includes the step of utilizing said means for controllably exerting pressure inside said tube volume.

12. The centrifuge tube as in claim 11, wherein said means for controllably exerting pressure is a resiliently biasing surface formed on said top occluding means;

wherein said step of utilizing said means for controllably exerting pressure inside said tube includes the step of resiliently biasing said resiliently biasing surface.

* * * * *